(12) United States Patent
Lorenz

(10) Patent No.: US 7,343,807 B2
(45) Date of Patent: Mar. 18, 2008

(54) PRESSURE SENSOR IN THE FORM OF A FILM

(75) Inventor: Holger Lorenz, BernKastel (DE)

(73) Assignee: IEE International Electronics & Engineering S.A. (LU)

(*) Notice: Subject to any disclaimer, the term of this patent is extended or adjusted under 35 U.S.C. 154(b) by 0 days.

(21) Appl. No.: 10/558,978

(22) PCT Filed: Jun. 21, 2004

(86) PCT No.: PCT/EP2004/051179

§ 371 (c)(1),
(2), (4) Date: Aug. 7, 2006

(87) PCT Pub. No.: WO2005/001864

PCT Pub. Date: Jan. 6, 2005

(65) Prior Publication Data

US 2007/0056385 A1   Mar. 15, 2007

(30) Foreign Application Priority Data

Jun. 23, 2003   (EP) ................... 03101840

(51) Int. Cl.
*G01L 7/08* (2006.01)
(52) U.S. Cl. .............. 73/715; 73/719; 73/753
(58) Field of Classification Search ........... 73/700–756
See application file for complete search history.

(56) References Cited

U.S. PATENT DOCUMENTS 4,794,366 A   12/1988   Sakamoto
5,948,990 A   9/1999    Hashida
6,109,117 A   8/2000    Stanley

FOREIGN PATENT DOCUMENTS

| DE | 34 46 327 | 6/1986 |
| EP | 0 891 898 | 1/1999 |
| EP | 1 106 977 | 6/2001 |
| WO | WO 99/39168 | 8/1999 |

OTHER PUBLICATIONS

International Search Report; PCT/EP2004/051179; Nov. 25, 2004.

*Primary Examiner*—Edward Lefkowitz
*Assistant Examiner*—Jermaine Jenkins
(74) *Attorney, Agent, or Firm*—Cantor Colburn LLP

(57) ABSTRACT

The invention relates to a pressure sensor in the form of a film, comprising a first carrier film and a second carrier film which are arranged at a certain distance from each other by means of a spacer. The distance holder comprises at least one recess which defines an active region of the pressure sensor wherein both of the carrier films are arranged opposite each other, also comprising a first electrode and a second electrode and a layer made of pressure-sensitive material. The first electrode, the second electrode and the layer made of pressure-sensitive material are disposed in the active region on the first and/or second carrier film such that when the carrier films are pressed together through the pressure sensitive layer, electric contact is produced between the first and the second electrode. According to the invention, the pressure sensor comprises at least one third electrode which is disposed in the active region of the pressure sensor on the first and second carrier film such that when the carrier films are pressed together though the pressure sensitive layer, electric contact is produced between the third electrode and the first electrode and/or between the third electrode and the second electrode.

20 Claims, 4 Drawing Sheets

PRESSURE SENSOR IN THE FORM OF A FILM

TECHNICAL FIELD OF THE INVENTION

This invention concerns a foil-type pressure sensor.

Foil-type pressure sensors, for example, membrane switches, film pressure sensors or similar, generally comprise at least two essentially elastic layers of film arranged a certain distance apart from each other. This is done, for example, by means of a spacer arranged round the active zone of the switch element and to which the two film layers are fixed with adhesive by their respective edges. In the active zone of the switch element, different arrangements of contacts are applied on the film layers, between which an electrical contact is established when the two film layers are pressed together, so that the switch element is actuated. On the release of the pressure on the film layers, the latter return, due to their elastic character, to their separated positions, and the electrical contact between the different arrangements of contacts is interrupted.

Such switch elements present very good response behaviour, which can also be adapted to particular applications by appropriate configuration of the elastic film layers. A switch element of this type also has very small installation thickness, and is distinguished in particular by the numerous different shapes, which it is possible to give to the switching surface. For this reason, such switch elements are particularly suitable for applications in domains in which small constructional dimensions and flexible configuration of the switching surface are required.

In contrast to simple membrane switches, foil-type pressure sensors have an additional pressure-sensitive layer applied in the active zone of the sensor in such a way that electrical contact is established between the arrangements of contacts via the pressure-sensitive layer. Two types of such foil-type pressure sensors are commonly used.

In foil-type pressure sensors that function in through-mode, a first contact element is arranged on a first carrier foil and a second contact element is arranged on a second carrier foil, the two carrier foils being arranged a certain distance apart from each other in such a way that the two contact elements are opposite each other. Between the two contact elements, a layer of semi-conductive material is positioned, and this is pressed against the two contact elements when the sensor is actuated, causing the resistance between the two contact elements to vary as a function of the pressure exerted.

Foil-type pressure sensors that function in shunt mode, have two contact elements arranged a certain distance apart from each other on a first carrier foil. On a second carrier foil, a semi-conductive layer is applied in such a way that it covers the area between the two contact elements and makes pressure-dependent contact with the two contact elements when the carrier foils are pressed together.

Irrespective of the particular type of the foil-type pressure sensor, its pressure-dependent characteristic resistance curve possesses a trigger point that corresponds to the pressure at which the initial contact is established between the two electrode elements. Above this trigger point, the characteristic curve presents a dynamic path, which can be matched to the requirements of a particular application by corresponding configuration of the carrier foils, the pressure-sensitive layer and the configuration of the electrodes. Even the trigger point of the characteristic curve can be adjusted to a desired value, for example, by suitable configuration of the carrier foils and the spacer.

However, a trigger point value so adjusted is only valid for central actuation of the sensor element, i.e. for pressure exerted on the central area of the active zone of the sensor cell. If actuation occurs externally to the centre, due to the membrane mechanics of the sensor cell, the electrodes will only make contact at an exerted pressure higher than the trigger threshold. This means, however, that a genuine actuation of the sensor element by an exerted pressure in proximity to the trigger threshold will not be recognized.

BRIEF SUMMARY OF THE INVENTION

It was therefore the task of the invention to propose a pressure sensor wherein actuation external to the central area can be recognized.

This task is fulfilled according to the invention by a pressure sensor according to claim 1. This foil-type pressure sensor comprises a first carrier foil and a second carrier foil arranged a certain distance apart from each other by means of a spacer, the spacer having at least one recess which defines an active zone of the pressure sensor, in which the two carrier foils are positioned opposite each other, a first electrode and a second electrode and layer of pressure-sensitive material, the first electrode, the second electrode and the layer of pressure-sensitive material being applied in the active zone on the first or the second carrier foil, respectively, in such a way that when the carrier foils are pressed together, an electrical contact is established via the pressure sensitive layer between the first and second electrodes. According to the invention, the pressure sensor has at least one third electrode which is applied in the active zone of the pressure sensor to the first or the second carrier foil in such a way that when the carrier foils are pressed together, an electrical contact is established by the pressure-sensitive layer between the third electrode and the first electrode and/or between the third electrode and the second electrode.

The third electrode of the pressure sensor according to the invention is preferably located outside the centre in the active zone of the pressure sensor. In this way, when pressure is exerted on the pressure sensor outside the centre, the third electrode can accordingly be brought into contact via the pressure sensitive layer with the first and/or the second electrode before electrical contact is established by the pressure-sensitive layer, between the first electrode and the second electrode. This electrical contact can be measured by a connected evaluation circuit, for example, by measuring the resistance between the third electrode and the first and/or second electrode. Thus in contrast to conventional pressure sensors, by means of the proposed pressure sensor, actuation outside the central area of the sensor can already be recognized if the force exerted on the pressure sensor lies in the region of the actual trigger threshold of the pressure sensor.

It should be noted that the additional at least one third electrode can also be used to check the pressure sensor in its conformity of operation. In the proposed pressure sensor, it is indeed possible to measure, either simultaneously or alternately, the resistance between the first and second electrodes and the resistance between the third and the first and/or second electrodes, and the corresponding value of the pressure exerted on the switch element can be ascertained. Should significant disparities be observed in the pressure values observed, this may indicate faulty behaviour in the sensor cell.

Furthermore, with suitable arrangements of the individual electrodes relative to each other, the at least one third electrode can be used to provide the pressure sensor with a supplementary switching stage. For example, the electrodes can be positioned relative to each other in such a way that a first electrical contact between, for example, the first and second electrode, arises when a first pressure threshold is exceeded, while a second electrical contact, between the third electrode and, for example, the first or, respectively, the second electrode, only arises when a second, higher pressure threshold is exceeded. By this means, with an appropriate number of additional third electrodes, a switch element with any desired number of switching stages can in principle be produced.

In a first form of embodiment of the pressure sensor, the first, second and the at least one third electrode are affixed side by side a certain distance apart from each other to the first carrier foil. The pressure-sensitive layer is then applied on the second carrier foil in such a way that the pressure-sensitive layer is positioned opposite the first electrode, the second electrode and the at least one third electrode.

In another form of embodiment, the first electrode and the second electrode are arranged a certain distance apart from each other on the first carrier foil and the at least one third electrode is positioned on the second carrier foil in such a way that the at least one third electrode is positioned opposite the first and second electrode. In this configuration of the pressure sensor, the pressure-sensitive layer can be applied on the at least one third electrode or to the first electrode and the second electrode.

In another form of embodiment, the first electrode and the second electrode are arranged a certain distance apart from each other on the first carrier foil and the at least one third electrode is positioned on the second carrier foil in such a way that the at least one third electrode is positioned opposite the first electrode, the pressure-sensitive layer being applied in such a way to the second carrier foil and the at least one third electrode that the pressure-sensitive layer is positioned opposite the first and second electrodes.

A variant on this form of embodiment displays at least two additional electrodes. In such a form of embodiment, the first electrode and the second electrode are arranged a certain distance apart from each other on the first carrier foil. A third electrode and a fourth electrode are positioned on the second carrier foil in such a way that the third electrode is positioned opposite the first electrode and the fourth electrode is positioned opposite the second electrode. The pressure-sensitive layer is preferably applied on the second carrier foil, the third electrode and the fourth electrode in such a way that the pressure-sensitive layer is positioned opposite the first and second electrodes.

It should be noted that in addition to the forms of embodiment explicitly described, combinations of these forms of embodiment are also possible.

The proposed pressure sensors have extremely numerous applications. One quite specific application for these pressure sensors is, for example, in the domain of seat occupancy sensors for motor vehicles. Such a seat occupancy sensor comprises, for example, two of the pressure sensors described above, arranged a certain distance apart from each other in a surface of a seat in such a way that a first pressure sensor is allocated to a first area of the seat and a second pressure sensor is allocated to a second area of the seat. In this configuration, the first and second pressure sensors are connected together in such a way as to constitute a logical AND gate.

In a possible form of embodiment of the seat occupancy sensor, the first and second pressure sensors are connected together in series, so that, for example, the third electrodes of each of the first and second pressure sensors are in contact together.

In another form of embodiment of the seat occupancy sensor with at least two additional pressure sensors, a third pressure sensor is connected to the first pressure sensor in such a way as to constitute a logical OR gate and a fourth pressure sensor is connected to the second pressure sensor in such a way as to constitute a logical OR gate. To constitute these logic layouts, the first and third pressure sensors and the second and fourth pressure sensors in each case are connected in parallel. This can be done, for example, if the first electrodes of each of the first and third pressure sensors, or the second and fourth pressure sensors, respectively, are in contact with each other, and the second electrodes of each of the first and third pressure sensors, or the second and fourth pressure sensors, respectively, are in contact with each other.

BRIEF DESCRIPTION OF THE DRAWINGS

In what follows, an embodiment of the invention is described with reference to the attached figures. These show the following.

DETAILED DESCRIPTION OF THE INVENTION

Figure 1:
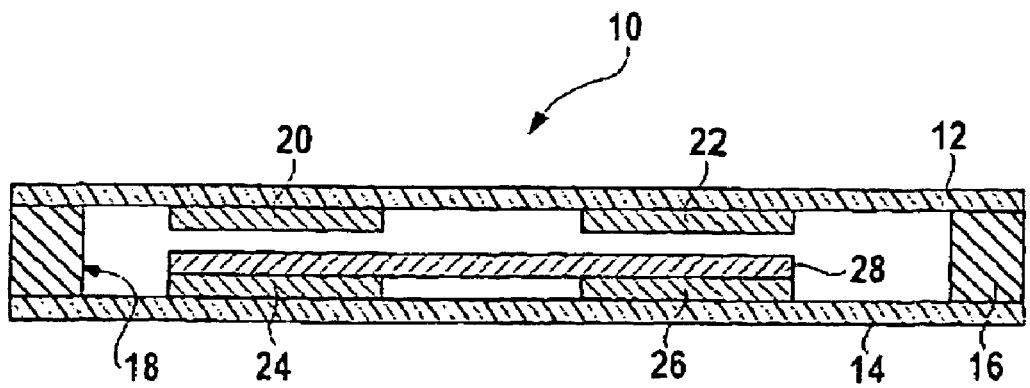
FIG. 1 a cross-section through an embodiment of a pressure sensor.

FIG. 1 shows a cross-section through an embodiment of a pressure sensor. The pressure sensor 10 comprises a first carrier foil 12 and a second carrier foil 14 arranged a certain distance apart from each other by means of a spacer 16. The spacer 16 has a recess 18, which defines an active zone of the pressure sensor.

Inside the recess 18, a first electrode 20 and a second electrode 22 are arranged a certain distance apart from each other on the first carrier foil 12. A third electrode 24 and a fourth electrode 26 are similarly arranged a certain distance apart from each other on the second carrier foil 14. In this configuration, the third electrode and the fourth electrode are arranged in such a way that the third electrode is positioned opposite the first electrode 20 while the fourth electrode 26 is positioned opposite the second electrode 22. A layer 26 made of pressure-sensitive material is applied on the third and fourth electrodes 24 or 26, respectively, in such a way that the space between the two electrodes 24 and 26 is entirely bridged.

Figure 2:
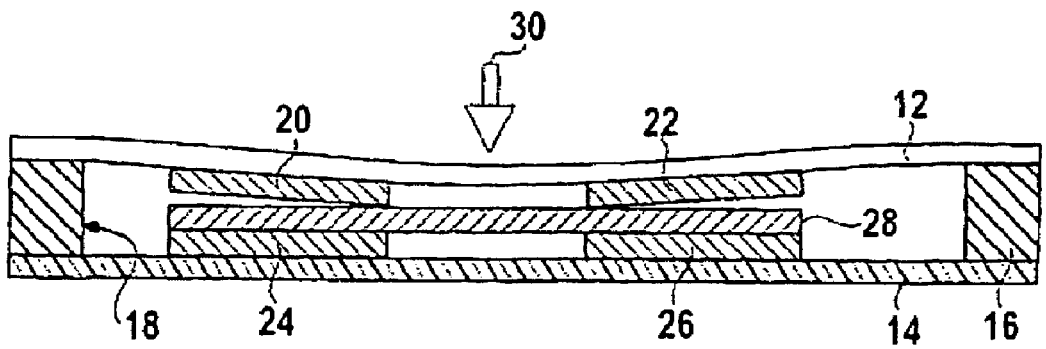
FIG. 2 the pressure sensor in FIG. 1 with central actuation.

The pressure sensor 10 shown in FIG. 1 essentially represents a pressure sensor in "shunt mode", wherein, when the carrier foils 12 and 14 are pressed together, electrical contact is established via the pressure-sensitive layer 28 between the electrodes 20 and 22. A view of the pressure sensor 10 in centrally actuated state (indicated by the arrow 30) is shown in FIG. 2.

However, by the incorporation of the third electrode 24 or, respectively, the fourth electrode 26, in the pressure sensor 10 shown, electrical contact can also be established in through-mode, as it is called, in each of the two pressure sensors, between the electrode 20 and the electrode 24, or, respectively, the electrode 22 and the electrode 26. By this means, when using the proposed pressure sensor, actuation of the sensor can be recognized even when this occurs outside the central area. Such non-central actuation of the pressure sensor is shown in FIG. 3.

Figure 3:
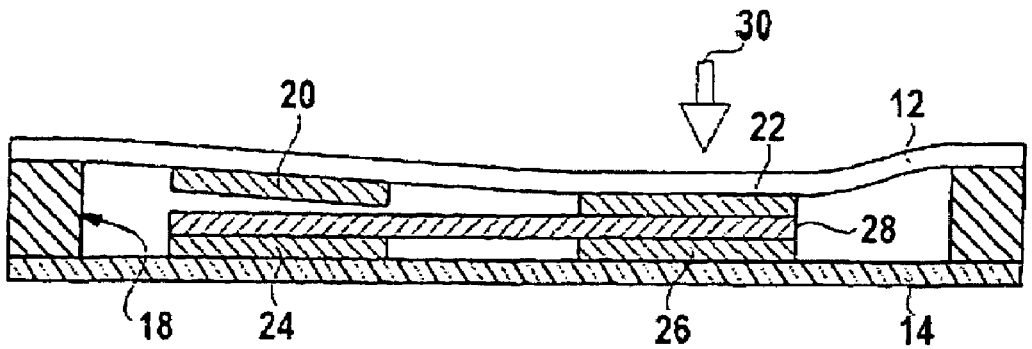
FIG. 3 the pressure sensor in FIG. 1 with non-central actuation.

As shown in FIG. 3, the pressure exerted (indicated by the arrow 30) does not act on the centre of the active zone of the pressure sensor, but is displaced laterally from the centre. The deformations of the first carrier foil 12 under the influence of the pressure exerted consequently occur asymmetrically with respect to the centre of the sensor, so that at constant pressure, no contact is established between the electrodes 20 and 22 via the pressure-sensitive layer 28. In classical foil-type pressure sensors, such actuation of the pressure sensor is consequently not recognized. With the proposed pressure sensor, however, non-central actuation of the pressure sensor can be recognized through the contact established by the pressure-sensitive layer 28 between the electrode 22 and the electrode 26 positioned opposite it.

Figure 4:
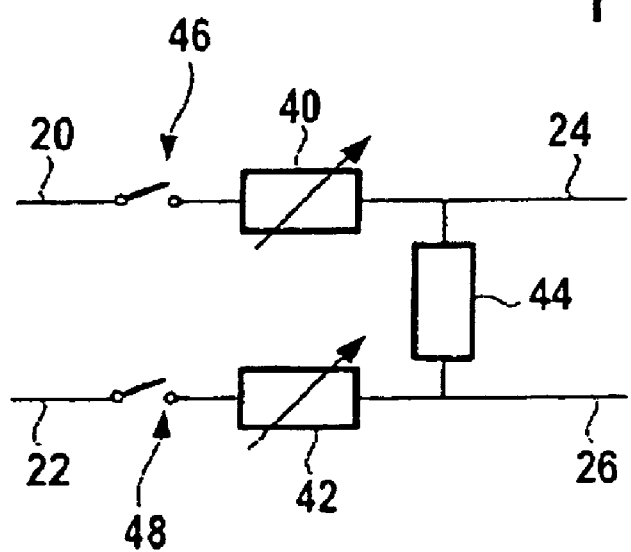
FIG. 4 a block circuit diagram of a pressure sensor according to FIG. 1, not actuated.

FIG. 4 shows a block circuit diagram of the non-actuated pressure sensor in FIG. 1. The pressure-dependent contact between the electrode 20 and the pressure-sensitive layer 28 is represented in this block circuit diagram as a variable resistance 40. Similarly, the pressure-dependent contact between the electrode 22 and the pressure-sensitive layer 28 is represented in this block circuit diagram as a variable resistance 42. The resistance 44 represents the pressure-sensitive layer 28 between the two electrodes. On actuation of the sensor element as shown, for example, in FIG. 2, an electric current can flow from the electrode 20 across the pressure-sensitive layer 28 to the electrode 22. If the pressure sensor is not actuated, no electrical contact is established between the electrodes 20 or 22, respectively, and the pressure-sensitive layer 28. This is represented in FIG. 4 by the two switches 46 and 48.

Figure 5:
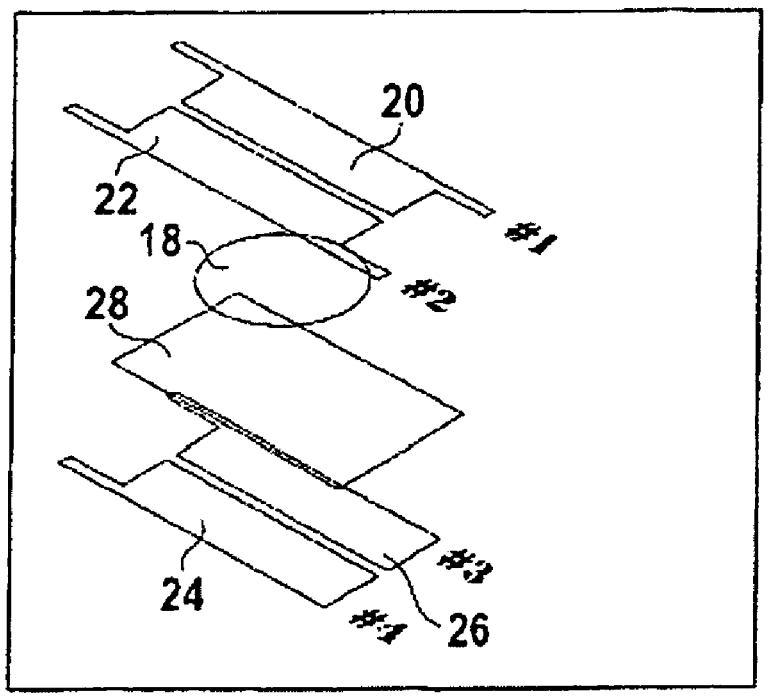
FIG. 5 a 3D view of the construction of the pressure sensor in FIG. 1.

FIG. 5 shows the different elements of the proposed pressure sensor in a schematic 3D view. The spacer 16 is represented in this form of embodiment, only schematically by the circular recess 18.

Figure 6:
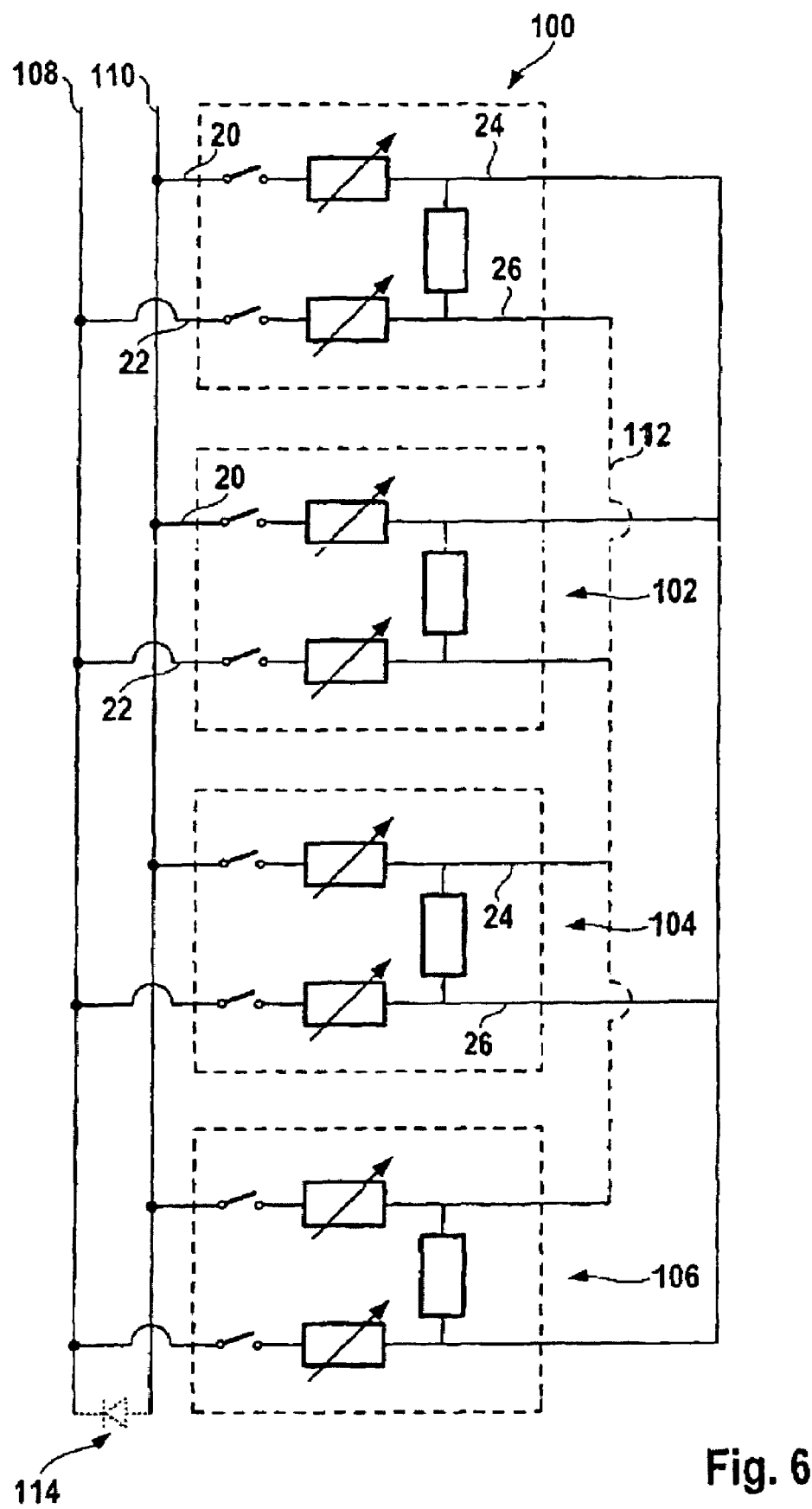
FIG. 6 a block circuit diagram of a seat occupancy sensor with pressure sensors.

FIG. 6 shows a schematic representation of a seat occupancy sensor comprising several of the pressure sensors 100, 102, 104, 106 described above. The individual pressure sensors 100 to 106 are here arranged at a certain distance from each other so that each of the pressure sensors can be allocated to a specific zone of a motor vehicle seat.

The individual pressure sensors 100, 102, 104 and 106 are connected via common connecting conductors 108 and 110 to an evaluating processor unit (not shown). In this configuration, the individual pressure sensors are connected in parallel, the electrodes 20 in each case being connected to the conductor 110, while the electrodes 22 are connected to the conductor 108. By means of this circuit layout, each individual pressure sensor independently can detect pressure exerted locally on the vehicle seat and thus enable recognition of localized seat occupancy. In this case, the output signal of the seat occupancy sensor is compiled from parallel connected resistance chains 40-44-42 of the actuated pressure sensor.

In addition to this circuit layout, the electrodes 24 of the sensors 100 and 102 are connected to the electrodes 26 of the sensors 104 and 106. This circuit layout means that the parallel-connected contacts (46, 40) of the pressure sensors 100 and 102 are connected in series with the parallel-connected contacts (42, 48) of the pressure sensors 104 and 106 between the two connecting conductors 108 and 110.

In the event of a seat occupancy of significant extent, so that for example both the contact (46, 40) of the pressure sensor 102 and the contact (42, 48) of the pressure sensor 106 are closed, the output signal (resistance) of the seat occupancy sensor is consequently determined by the serial connection of the variable resistances 40 of the pressure sensor 102 and 42 of the pressure sensor 106. With a corresponding arrangement of the individual pressure sensors, this state of the seat occupancy sensor is unambiguously identifiable so that such extensive occupancy of the seat can be recognized separately.

It should be noted that the electrodes 26 of the sensors 100 and 102 can optionally be connected to the electrodes 24 of the sensors 104 and 106. This is indicated by the optional conductor track 112 shown as a broken line in FIG. 6.

It should also be noted that for verification of the integrity of the conductor tracks between the connecting conductors 108 and 110, a diode 114 can be incorporated in the circuit.

Figure 7:
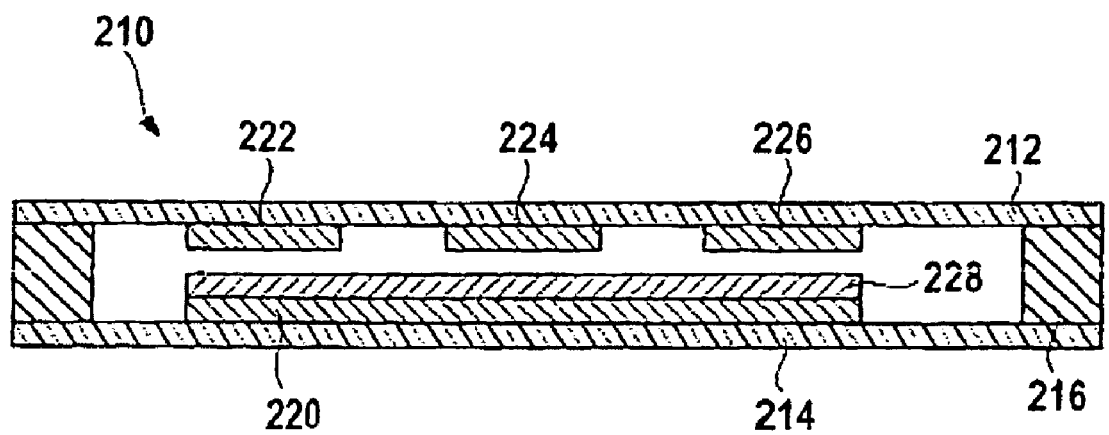
FIG. 7 a cross-section through another embodiment of a pressure sensor.

FIG. 7 shows another form of embodiment of a pressure sensor 210 with elements of this invention. A first carrier foil 212 and a second carrier foil 214 are arranged a certain distance apart from each other by means of a spacer 216. The second carrier foil 214 has fixed to it a first electrode 220, while the first carrier foil 212 has arranged on it three electrodes 222, 224, 226, laid out a certain distance apart from each other in such a way that each of the three electrodes 222, 224, 226 is positioned opposite a region of the electrode 220. In this form of embodiment, a layer 228 made of pressure-sensitive material is applied, for example, to the first electrode 220. Alternatively the layer 228 can be applied on the three electrodes 222, 224, 226.

If the pressure sensor 210 so configured is centrally actuated, as soon as a first pressure threshold is exceeded, a pressure-dependent electrical contact is established via the layer 228 between the electrode 224 and the electrode 220. If the pressure exerted on the pressure sensor 210 increases further, once a second pressure threshold is exceeded, electrical contact is similarly established between the electrodes 222 and 220 or, respectively, 226 and 220. The pressure sensor 210 accordingly has two different switching thresholds.

If, however, the pressure sensor is actuated laterally, for example, in the vicinity of the electrode 226, electrical contact is immediately established between the electrode 226 and the electrode 220 before the contact is established between the electrode 224 and the electrode 220. Lateral actuation of the pressure sensor 210 can accordingly be recognized with certitude. By calculation of the resistance between electrode pairs 222 and 224 or, respectively, 224 and 226, it can also be determined on which side the pressure sensor has been actuated.

It should be noted that by the addition of further electrodes on the first carrier foil, the number of distinct switching stages of the pressure sensor can be augmented as required. Alternatively, or additionally, the number of switching stages can also be augmented by distributing the electrodes 222, 224 and 226 asymmetrically, with respect to a centreline of the pressure sensor.

Figure 8:
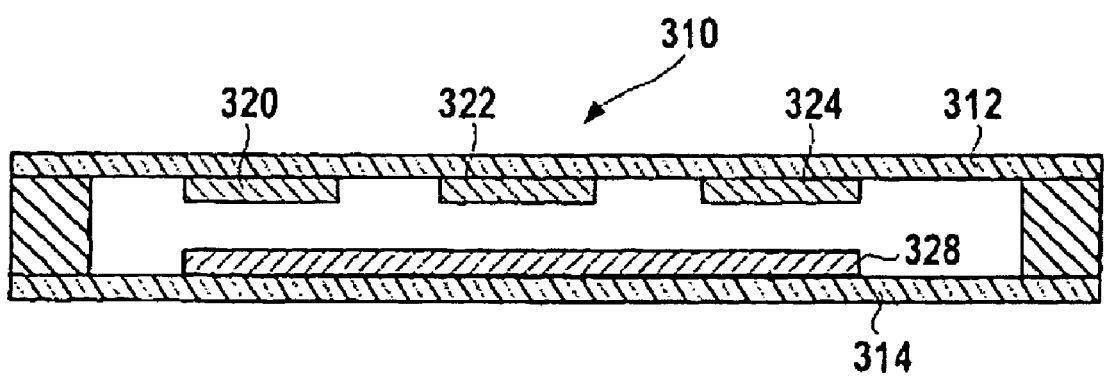
FIG. 8 a cross-section through another embodiment of a pressure sensor.

A further form of embodiment of a pressure sensor 310 is shown in FIG. 8. This is a pressure sensor that operates in what is called shunt mode.

In this pressure sensor, three electrodes 320, 322 and 324 are affixed to the first carrier foil 312, while a layer 328 of pressure-sensitive material is applied on the second carrier foil 314. In this sensor, by calculation of the resistance between the electrode pairs 320 and 322 or, respectively, 322 and 324, it is possible to determine, for example, on which side the pressure sensor has been actuated.

The invention claimed is:

1. A foil-type pressure sensor associated with an evaluation circuit, wherein said foil-type pressure sensor comprises:
   a first carrier foil and a second carrier foil, arranged a certain distance apart from each other by means of a spacer, the spacer having at least one recess which defines an active zone of the pressure sensor in which the two carrier foils face each other;
   a first electrode and a second electrode and a layer made of pressure sensitive material, said first electrode, said second electrode and said layer of pressure sensitive material being applied, in the active zone, respectively on the first and the second carrier foil in such a way that when the carrier foils are pressed together, an electrical contact is established via the pressure sensitive layer between the first and second electrodes, and wherein, the first electrode and the second electrode are connected to said evaluating circuit in such a way that, during use of the pressure sensor, an electrical resistance of the electrical contact between the first and second electrode can be measured; and
   at least one third electrode which is applied on either the first or the second carrier foil in the active zone of the pressure sensor in such a way that when the carrier foils are pressed together, an electrical contact is established by the pressure sensitive layer between the third electrode and the first electrode and/or between the third electrode and the second electrode, wherein the third electrode is connected to said evaluating circuit in such a way that, during use of the pressure sensor, an electrical resistance of the electrical contact between the third electrode and the first electrode and/or between the third electrode and the second electrode can be measured.

2. Pressure sensor according to claim 1 wherein the first, second and at least one third electrode are applied next to each other a certain distance apart from each other on the first carrier foil, and wherein the pressure sensitive layer is applied on the second carrier foil in such a way that the pressure sensitive layer is arranged opposite to the first electrode, the second electrode and the at least one third electrode.

3. Pressure sensor according to claim 1, wherein the first electrode and the second electrode are arranged a certain distance apart from each other on the first carrier foil, wherein at least one third electrode is arranged on the second carrier foil in such a way that the at least one third electrode is arranged opposite the first and second electrodes.

4. Pressure sensor according to claim 3, wherein the pressure sensitive layer is applied on the at least one third electrode.

5. Pressure sensor according to claim 3, wherein the pressure sensitive layer is applied on the first and the second electrode.

6. Pressure sensor according to claim 1, wherein the first electrode and the second electrode are applied a certain distance apart from each other on the first carrier foil wherein the at least one third electrode is arranged on the second carder foil in such a way that the at least one third electrode is arranged opposite the first electrode and wherein the pressure sensitive layer is applied on the second carrier foil and on the at least one third electrode in such a way that the pressure sensitive layer is arranged opposite the first and second electrodes.

7. Pressure sensor according to claim 1, wherein the first electrode and the second electrode are applied a certain distance apart from each other on the first carrier foil and wherein a third electrode and a fourth electrode are arranged on the second carrier foil in such a way that the third electrode is arranged opposite the first electrode and the fourth electrode is arranged opposite the second electrode, and wherein the pressure sensitive layer is applied on the second carrier foil, the third electrode and the fourth electrode in such a way that the pressure sensitive layer is positioned opposite the first and second electrodes.

8. Seat occupancy sensor comprising two pressure sensors according to claim 1, said two pressure sensors for being associated a certain distance apart from each other to the surface of a seat in such a way that a first pressure sensor is associated to a first zone of the seat and a second pressure sensor is associated to a second zone of the seat, wherein the first and second pressure sensors are connected together in such a way as to implement a logical AND gate.

9. Seat occupancy sensor according to claim 8, wherein the first and second pressure sensors are connected in series.

10. Seat occupancy sensor according to claim 9, wherein the third electrodes of each of the first and second pressure sensors are connected together.

11. Seal occupancy sensor according to claim 8 with at least two additional pressure sensors, wherein a third pressure sensor is connected to the first pressure sensor in such a way as to implement a logical OR gate and wherein a fourth pressure sensor is connected to the second pressure sensor in such a way as to implement a logical OR gate.

12. Seat occupancy sensor according to claim 11 wherein the first and third pressure sensors are connected in parallel and the second and fourth pressure sensors are connected in parallel.

13. Seat occupancy sensor according to claim 12 wherein the first electrodes of each of the first and third pressure sensors or, respectively, of the second and fourth pressure sensors, are in contact together and the second electrodes of each of the first and third pressure sensors or, respectively, of the second and fourth pressure sensors, are in contact together.

14. A foil-type pressure sensor, comprising:
   a first carrier foil and a second carrier foil, arranged a certain distance apart from each other by means of a spacer, the spacer having at least one recess which defines an active zone of the pressure sensor in which the two carrier foils face each other;
   a first electrode and a second electrode, said first electrode and said second electrode being applied a certain distance apart from each other on the first carrier foil;
   a third electrode and a fourth electrode, said third electrode and said fourth electrode being arranged on the second carrier foil in such a way that the third electrode is arranged opposite the first electrode and the fourth electrode is arranged opposite the second electrode; and
   a layer of pressure sensitive material, said layer of pressure sensitive material being applied, in the active zone, on the second carrier foil, the third electrode and the fourth electrode in such a way that the pressure sensitive layer is positioned opposite the first and second electrodes, wherein said first electrode, said second electrode and said layer of pressure sensitive material being arranged such that, when the carrier foils are pressed together, an electrical contact is established via the pressure sensitive layer between the first and second electrodes, wherein, during use of the pressure sensor, the first electrode and the second electrode are connectable to an evaluating circuit such that an electrical resistance of the electrical contact between the first and second electrode can be measured, wherein said third electrode and said fourth electrode are arranged such that, when the carrier foils are pressed together, an electrical contact is established by the pressure sensitive layer between the third electrode and the first electrode and/or between the fourth electrode and the second electrode, and wherein, during use of the pressure sensor, the third electrode and the fourth electrode are connectable to an evaluating circuit such that an electrical resistance of the electrical contact between the third electrode and the first electrode and/or between the fourth electrode and the second electrode can be measured.

15. A seat occupancy sensor including a first and a second pressure sensor, each one of said first and second pressure sensors comprising:

a first carrier foil and a second carrier foil, arranged a certain distance apart from each other by means of a spacer, the spacer having at least one recess which defines an active zone of the pressure sensor in which the two carrier foils face each other;

a first electrode and a second electrode and a layer made of pressure sensitive material, said first electrode, said second electrode and said layer of pressure sensitive material being applied, in the active zone, respectively on the first and the second carrier foil in such a way that when the carrier foils are pressed together, an electrical contact is established via the pressure sensitive layer between the first and second electrodes, and wherein, during use of the pressure sensor, the first electrode and the second electrode are connectable to an evaluating circuit in such a way that an electrical resistance of the electrical contact between the first and second electrode can be measured; and at least one third electrode which is applied on either the first or the second carrier foil in the active zone of the pressure sensor in such a way that when the carrier foils are pressed together, an electrical contact is established by the pressure sensitive layer between the third electrode and the first electrode and/or between the third electrode and the second electrode, wherein, during use of the pressure sensor, the third electrode is connectable to an evaluating circuit in such a way that an electrical resistance of the electrical contact between the third electrode and the first electrode and/or between the third electrode and the second electrode can be measured, wherein the first and second pressure sensors are disposed a certain distance apart from each other to the surface of a seat such that said first pressure sensor is associated to a first zone of the seat and said second pressure sensor is associated to a second zone of the seat, and the first and second pressure sensors are connected together so as to implement a logical AND gate.

16. The seat occupancy sensor according to claim 15, wherein the first and second pressure sensors are connected in series.

17. The seat occupancy sensor according to claim 16, wherein the third electrodes of each of the first and second pressure sensors are connected together.

18. The seat occupancy sensor according to claim 15, further comprising at least two additional pressure sensors, wherein a third pressure sensor is connected to the first pressure sensor so as to implement a logical OR gate and wherein a fourth pressure sensor is connected to the second pressure sensor so as to implement a logical OR gate.

19. The seat occupancy sensor according to claim 18, wherein the first and third pressure sensors are connected in parallel and the second and fourth pressure sensors are connected in parallel.

20. The seat occupancy sensor according to claim 19, wherein the first electrodes of each of the first and third pressure sensors or, respectively, of the second and fourth pressure sensors, are in contact together and the second electrodes of each of the first and third pressure sensors or, respectively, of the second and fourth pressure sensors, are in contact together.

* * * * *